United States Patent
Koo et al.

(10) Patent No.: US 12,360,303 B2
(45) Date of Patent: Jul. 15, 2025

(54) POLARIZING PLATE AND OPTICAL DISPLAY APPARATUS COMPRISING SAME

(71) Applicant: Samsung SDI Co., Ltd., Yongin-si (KR)

(72) Inventors: Jun Mo Koo, Suwon-si (KR); Bong Choon Kim, Suwon-si (KR); Jung Hun You, Suwon-si (KR); Sang Hum Lee, Suwon-si (KR); Dong Yoon Shin, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 753 days.

(21) Appl. No.: 17/593,903

(22) PCT Filed: Mar. 19, 2020

(86) PCT No.: PCT/KR2020/003765
§ 371 (c)(1),
(2) Date: Sep. 27, 2021

(87) PCT Pub. No.: WO2020/204411
PCT Pub. Date: Oct. 8, 2020

(65) Prior Publication Data
US 2022/0187524 A1    Jun. 16, 2022

(30) Foreign Application Priority Data

Apr. 2, 2019 (KR) .................. 10-2019-0038736
Jul. 30, 2019 (KR) .................. 10-2019-0092750

(51) Int. Cl.
*G02B 5/30* (2006.01)

(52) U.S. Cl.
CPC ......... *G02B 5/3041* (2013.01); *G02B 5/3083* (2013.01)

(58) Field of Classification Search
CPC ....... G02B 5/3041; G02B 5/3083; G02B 5/30
See application file for complete search history.

(56) References Cited

U.S. PATENT DOCUMENTS

| 12,078,832 B2 * | 9/2024 | Muramatsu | ........ C09K 19/3491 |
| 2010/0053510 A1 * | 3/2010 | Bitou | ........... B32B 27/286 |
| | | | 349/98 |

(Continued)

FOREIGN PATENT DOCUMENTS

| CN | 101959950 A | 1/2011 |
| CN | 103389536 A | 11/2013 |

(Continued)

OTHER PUBLICATIONS

Korean Office Action from corresponding Korean Application No. 10-2019-0092750, Korean Office Action mailed May 19, 2022 (5 pgs.).

(Continued)

*Primary Examiner* — Ricky L Mack
*Assistant Examiner* — Anna Smith
(74) *Attorney, Agent, or Firm* — Womble Bond Dickinson (US) LLP

(57) ABSTRACT

A polarizing plate and an optical display apparatus including the same. The polarizing plate includes: a polarizer; a first retardation layer; and a second retardation layer, the first retardation layer and the second retardation layer being sequentially laminated on a lower surface of the polarizer, wherein the first retardation layer has a short wavelength dispersion of about 1 to about 1.03, a long wavelength dispersion of about 0.98 to about 1, and an in-plane retardation of about 220 nm to about 270 nm at a wavelength of about 550 nm, the second retardation layer has a short wavelength dispersion of about 1 to about 1.1, a long wavelength dispersion of about 0.96 to about 1, and an in-plane retardation of about 80 nm to about 130 nm at a (Continued)

wavelength of about 550 nm, and a ratio (Rth/d) of out-of-plane retardation (Rth, unit:nm) of the second retardation layer at a wavelength of about 550 nm to thickness (d, unit:μm) of the second retardation layer ranges from about −33 nm/μm to about −15 nm/μm.

19 Claims, 1 Drawing Sheet

(56) References Cited

U.S. PATENT DOCUMENTS

| | | | |
|---|---|---|---|
| 2010/0068419 A1* | 3/2010 | Kim | G02B 5/3016 |
| | | | 428/1.23 |
| 2013/0301129 A1 | 11/2013 | In et al. | |
| 2014/0247487 A1* | 9/2014 | Jeon | G02F 1/133634 |
| | | | 359/489.07 |
| 2015/0002010 A1 | 1/2015 | Lee et al. | |
| 2015/0131031 A1 | 5/2015 | Kim et al. | |
| 2016/0025913 A1* | 1/2016 | Oh | G02B 5/3083 |
| | | | 359/487.02 |
| 2016/0085101 A1* | 3/2016 | Saitoh | G02F 1/133617 |
| | | | 349/193 |
| 2017/0023716 A1* | 1/2017 | Kitagawa | G02B 5/305 |
| 2018/0284332 A1* | 10/2018 | Murashige | H10K 50/86 |
| 2019/0079343 A1* | 3/2019 | Fuchida | G02F 1/133502 |

FOREIGN PATENT DOCUMENTS

| | | |
|---|---|---|
| CN | 103869402 A | 6/2014 |
| CN | 104252016 A | 12/2014 |
| CN | 104950371 A | 9/2015 |
| CN | 106873065 | 6/2017 |
| CN | 107884863 A | 4/2018 |
| KR | 10-2013-0103595 A | 9/2013 |
| KR | 10-2013-0126524 A | 11/2013 |
| KR | 10-2015-0002354 A | 1/2015 |
| KR | 10-2016-0012274 A | 2/2016 |
| KR | 10-2018-0036864 A | 4/2018 |
| KR | 10-2018-0041610 A | 4/2018 |
| TW | 201504695 A | 2/2015 |

OTHER PUBLICATIONS

International Search Report corresponding to Application No. PCT/KR2020/003765 dated Jun. 29, 2020, 4 pp.
Chinese Office Action dated Dec. 5, 2022 issued in corresponding Chinese Application No. 202080023668.1 (10 pages).

* cited by examiner

POLARIZING PLATE AND OPTICAL DISPLAY APPARATUS COMPRISING SAME

CROSS-REFERENCE TO RELATED APPLICATIONS

This application is a U.S. National Phase Patent Application of International Application Number PCT/KR2020/003765, filed on Mar. 19, 2020, which claims priority to Korean Patent Application Number 10-2019-0038736, filed on Apr. 2, 2019, and Korean Patent Application Number 10-2019-0092750, filed on Jul. 30, 2019, the entire contents of all of which are incorporated herein by reference.

TECHNICAL FIELD

The present invention relates to a polarizing plate and an optical display apparatus including the same.

BACKGROUND ART

An organic light emitting diode display can have poor visibility and contrast due to reflection of external light. In order to solve such a problem, a polarizing plate including a polarizer and a retardation film is used to realize an anti-reflection function to prevent reflected external light from leaking out.

Typical retardation films are prepared by stretching a non-oriented film in a longitudinal direction or transverse direction thereof so as to be attached to a polarizer by a roll-to-roll process. However, such a typical retardation film causes increase in reflectivity of a polarizing plate and thus difficulty in use due to lack of angle optimization. In order to solve such a problem by adjusting an angle between a transmission axis of a polarizer and a slow axis of a retardation film, a roll of the retardation film needs to be unrolled, tilted at a certain angle, and cut before being attached to the polarizer, causing huge waste of the retardation film. In addition, there has been proposed a method of preparing a retardation film by stretching a non-oriented film in an oblique direction. However, this method has problems of: requiring a thick film to meet a target retardation value; and difficulty in controlling uniformity in thickness over the entire width of the film.

Recently, with development of a material for retardation films, there has been developed a method of preparing a retardation film by coating a base film or any retardation film with liquid crystal or the like. However, in this method, an alignment film needs to be included in a film product so as to orient the liquid crystal at a certain angle, causing generation of foreign matter. In addition, this method has problems of: deterioration in UV resistance due to high absorption in the UV region due to composition characteristics of the liquid crystal; and requiring a separate adhesive due to low adhesion between the base film and the coating layer.

The background technique of the present invention is disclosed in Korean Patent Laid-open Publication No. 10-2013-0103595 and the like.

DISCLOSURE

Technical Problem

It is one object of the present invention to provide a polarizing plate which allows significant reduction in thickness thereof and has significantly low front reflectivity and side reflectivity.

It is another object of the present invention to provide a polarizing plate which has low front reflectivity and side reflectivity for all wavelengths.

It is a further object of the present invention to provide a polarizing plate which has good light resistance.

It is yet another object of the present invention to provide an optical display apparatus which includes the polarizing plate set forth above.

Technical Solution

One aspect of the present invention relates to a polarizing plate.

1. The polarizing plate includes: a polarizer; a first retardation layer; and a second retardation layer, the first retardation layer and the second retardation layer being sequentially laminated on a lower surface of the polarizer, wherein the first retardation layer has a short wavelength dispersion of about 1 to about 1.03, a long wavelength dispersion of about 0.98 to about 1, and an in-plane retardation of about 220 nm to about 270 nm at a wavelength of about 550 nm, the second retardation layer has a short wavelength dispersion of about 1 to about 1.1, a long wavelength dispersion of about 0.96 to about 1, and an in-plane retardation of about 80 nm to about 130 nm at a wavelength of about 550 nm, and a ratio (Rth/d) of out-of-plane retardation (Rth, unit:nm) of the second retardation layer at a wavelength of about 550 nm to thickness (d, unit:μm) of the second retardation layer ranges from about −33 nm/μm to about −15 nm/μm.

2. In Embodiment 1, the first retardation layer may be an obliquely stretched film and the second retardation layer may be an obliquely stretched coating layer.

3. In Embodiments 1 to 2, the second retardation layer may be directly formed on the first retardation layer.

4. In Embodiments 1 to 3, a slow axis of the first retardation layer may be disposed at an angle of about +65° to about +75° or about −65° to about −75° with respect to a transmission axis of the polarizer.

5. In Embodiments 1 to 4, the second retardation layer may have an out-of-plane retardation of about −200 nm to about −100 nm at a wavelength of about 550 nm.

6. In Embodiments 1 to 5, the second retardation layer may have a thickness of about 2 μm to about 8 μm.

7. In Embodiments 1 to 6, an angle defined between a slow axis of the first retardation layer and a slow axis of second retardation layer may range from about 58° to about 70°.

8. In Embodiments 1 to 7, a ratio of short wavelength dispersion of the second retardation layer to short wavelength dispersion of the first retardation layer may range from about 1 to about 1.08.

9. In Embodiments 1 to 8, a ratio of long wavelength dispersion of the second retardation layer to long wavelength dispersion of the first retardation layer may range from about 0.96 to about 1.

10. In Embodiments 1 to 9, the first retardation layer may have a degree of biaxiality of about 1 to about 1.4 at a wavelength of about 550 nm and the second retardation layer may have a degree of biaxiality of about −2 to about 0 at a wavelength of about 550 nm.

11. In Embodiments 1 to 10, the second retardation layer may be a non-liquid crystal layer.

12. In Embodiments 1 to 11, the second retardation layer may be formed of a composition for the second retardation layer, the composition including at least one selected from the group of a cellulose ester polymer and a styrene polymer, wherein the cellulose ester polymer and the styrene polymer may be each independently substituted with at least one selected from the group of a halogen, a nitro group, and an alkyl group, an alkenyl group, a cycloalkyl group, an aryl group, a heteroaryl group, an alkoxy group, and a halogen-containing functional group.

13. In Embodiments 1 to 12, a laminate of the first retardation layer and the second retardation layer may have a variance in out-of-plane retardation (ΔRth) of about 10 nm or less, as calculated according to Equation 1:

$$\Delta Rth = |Rth(0\ hr) - Rth(120\ hr)|, \quad (1)$$

where Rth(0 hr) denotes an absolute value (unit: nm) of initial Rth of the laminate of the first retardation layer and the second retardation layer, as measured at a wavelength of about 550 nm, and Rth(120 hr) denotes an absolute value (unit: nm) of Rth of the laminate of the first retardation layer and the second retardation layer, as measured at a wavelength of about 550 nm after irradiation of the laminate with light having a wavelength of about 360 nm at a fluence of 720 mJ/cm² for about 120 hours.

14. In Embodiments 1 to 13, a slow axis of the second retardation layer may be disposed at an angle of about +6° to about +8° or about −6° to about −8° with respect to a transmission axis of the polarizer.

15. In Embodiments 1 to 14, the polarizing plate may further include: a primer layer formed on a lower surface of the first retardation layer.

16. In Embodiments 1 to 15, the primer layer may contain particles having an average particle diameter (D50) of about 1 nm to about 500 nm.

17. In Embodiments 1 to 16, the particles may include at least one selected from the group of silicon oxide and titanium oxide.

18. In Embodiments 1 to 17, the polarizing plate may further include: a protective film laminated on an upper surface of the polarizer.

19. Another aspect of the present invention relates to an optical display apparatus.
The optical display apparatus includes the polarizing plate according to the present invention.

Advantageous Effects

The present invention provides a polarizing plate which allows significant reduction in thickness thereof and has significantly low front reflectivity and side reflectivity.

The present invention provides a polarizing plate which has low front reflectivity and side reflectivity for all wavelengths.

The present invention provides a polarizing plate which has good light resistance.

The present invention provides an optical display apparatus which includes the polarizing plate set forth above.

BEST MODE

Figure 1:
FIG. 1 is a sectional view of a polarizing plate according to one embodiment of the present invention.

Embodiments of the present invention will be described in detail with reference to the accompanying drawings to provide thorough understanding of the invention to those skilled in the art. It should be understood that the present invention may be embodied in different ways and is not limited to the following embodiments. In the drawings, portions irrelevant to the description will be omitted for clarity. Like components will be denoted by like reference numerals throughout the specification. Although lengths, thicknesses or widths of various components may be exaggerated for understanding in the drawings, it should be understood that the present invention is not limited thereto.

Herein, spatially relative terms such as "upper" and "lower" are defined with reference to the accompanying drawings. Thus, it will be understood that the term "upper surface" can be used interchangeably with the term "lower surface".

Herein, "in-plane retardation (Re)" is represented by Equation A, "out-of-plane retardation (Rth)" is represented by Equation B, and "degree of biaxiality (NZ)" is represented by Equation C:

<Equation A>

$$Re = (nx - ny) \times d \quad (A)$$

<Equation B>

$$Rth = ((nx + ny)/2 - nz) \times d \quad (B)$$

<Equation C>

$$NZ = (nx - nz)/(nx - ny) \quad (C)$$

(where nx, ny and nz are indexes of refraction of an optical element in the slow-axis, fast-axis, and thickness directions of the optical element at a measurement wavelength, respectively, and d is the thickness (unit: nm) of the optical element). In Equations A to C, the measurement wavelength may be 450 nm, 550 nm, or 650 nm.

Herein, "short wavelength dispersion" refers to Re(450)/Re(550), and "long wavelength dispersion" refers to Re(650)/Re(550), wherein Re(450), Re(550), and Re(650) refer to in-plane retardation (Re) of a single retardation layer or a laminate of retardation layers at wavelengths of about 450 nm, 550 nm, and 650 nm, respectively.

As used herein to represent an angle, "+" means a counterclockwise direction about a reference point, and "−" means a clockwise direction about the reference point.

As used herein to represent a specific numerical range, the expression "X to Y" means "greater than or equal to X and less than or equal to Y (X≤ and ≤Y)".

The inventors of the present invention fabricated a polarizing plate in which a first retardation layer having an in-plane retardation of about 220 nm to about 270 nm (for example, 220 nm, 230 nm, 240 nm, 250 nm, 260 nm, or 270 nm) at a wavelength of about 550 nm and a second retardation layer having an in-plane retardation of 80 nm to 130 nm (for example, 80 nm, 90 nm, 100 nm, 110 nm, 120 nm, or 130 nm) at a wavelength of about 550 nm are sequentially laminated on a lower surface of a polarizer, wherein the second retardation layer described in detail below is directly formed on a lower surface of the first retardation layer. As a result, the inventors of the present invention completed the present invention based on confirmation that the polarizing plate can allow reduction in thickness thereof, can reduce front reflectivity and side reflectivity for all wavelengths by reducing a difference in wavelength dispersion between the first retardation layer and the second retardation layer, and can have improved light resistance.

In the present invention, the second retardation layer is an obliquely stretched retardation film, and a ratio (Rth/d) of out-of-plane retardation (Rth, unit: nm) of the second retardation layer at a wavelength of about 550 nm to thickness (d, unit: μm) of the second retardation layer ranges from about −33 nm/μm to about −15 nm/μm (for example, −33 nm/μm, −32 nm/μm, −31 nm/μm, −30 nm/μm, −29 nm/μm, −28 nm/μm, −27 nm/μm, −26 nm/μm, −25 nm/μm, −24 nm/μm, −23 nm/μm, −22 nm/μm, −21 nm/μm, −20 nm/μm, −19 nm/μm, −18 nm/μm, −17 nm/μm, −16 nm/μm, or −15 nm/μm). In addition, the second retardation layer is formed of a composition including at least one selected from the group of a cellulose ester polymer and a polystyrene polymer, as described below.

Now, a polarizing plate according to one embodiment of the present invention will be described with reference to FIG. 1.

Referring to FIG. 1, the polarizing plate includes: a polarizer 110; a protective film 140 laminated on an upper surface of the polarizer 110; and a first retardation layer 120 and a second retardation layer 130 sequentially laminated on a lower surface of the polarizer 110.

The second retardation layer 130 may be directly formed on the first retardation layer 120. Herein, the expression "directly formed" means that no adhesive layer or bonding layer is interposed between the first retardation layer and the second retardation layer.

The first retardation layer 120 has positive dispersion properties, and may have a short wavelength dispersion of about 1 to about 1.03 (for example, 1, 1.01, 1.02, or 1.03), a long wavelength dispersion is about 0.98 to about 1 (for example, 0.98, 0.99, or 1), and an in-plane retardation of 220 nm to 270 nm at a wavelength of about 550 nm. Within these ranges, the first retardation layer can reduce front reflectivity and side reflectivity of the polarizing plate when used in the polarizing plate.

Preferably, the first retardation layer has a short wavelength dispersion of about 1 to about 1.02, a long wavelength dispersion of about 0.99 to about 1 or about 0.995 to about 1, and an in-plane retardation of about 220 nm to about 250 nm at a wavelength of about 550 nm.

In one embodiment, the first retardation layer 120 may have an in-plane retardation of about 220 nm to about 280 nm, specifically about 220 nm to about 278 nm, more specifically about 220 nm to about 257 nm, at a wavelength of about 450 nm, and an in-plane retardation of about 210 nm to about 270 nm, specifically about 215 nm to about 267 nm, more specifically about 215 nm to about 250 nm, at a wavelength of about 650 nm. Within these ranges, the desired levels of short wavelength dispersion and long wavelength dispersion of the first retardation layer can be easily reached.

The first retardation layer 120 may have an out-of-plane retardation of about 110 nm to 200 nm, specifically about 120 nm to about 160 nm, at a wavelength of about 550 nm. Within this range, the first retardation layer can reduce side reflectivity.

The first retardation layer 120 may have a degree of biaxiality about 1 to about 1.4, specifically about 1 to about 1.3, at a wavelength of about 550 nm. Within this range, the first retardation layer can reduce side reflectivity.

The first retardation layer 120 may include a film formed of an optically clear resin. For example, the first retardation layer 120 may include a film formed of at least one selected from the group of cellulose resins including triacetyl cellulose (TAC), polyester resins including polyethylene terephthalate, polybutylene terephthalate, polyethylene naphthalate (PEN), and polybutylene naphthalate, cyclic polyolefin resins, polycarbonate resins, polyether sulfone resins, polysulfone resins, polyamide resins, polyimide resins, polyolefin resins, polyarylate resins, polyvinyl alcohol resins, polyvinyl chloride resins, and polyvinylidene chloride resins. Preferably, the first retardation layer includes a cyclic polyolefin film so as to secure the desired levels of short wavelength dispersion and long wavelength dispersion. When used in the polarizing plate according to the present invention, the cyclic polyolefin film can provide reduction in front reflectivity of the polarizing plate.

The first retardation layer 120 may have a thickness of about 10 μm to about 60 μm, specifically about 20 μm to about 50 μm. Within this range, the first retardation layer can be used in the polarizing plate.

The first retardation layer 120 may be prepared by stretching a non-oriented film formed of the optically clear resin, and may be laminated on the polarizer by a subsequent roll-to-roll process to fabricate the polarizing plate, thereby allowing improvement in processability.

In one embodiment, the first retardation layer 120 may be a film obtained by obliquely stretching the non-oriented film at a predetermined angle with respect to a longitudinal direction (machine direction) of the non-oriented film to ensure that a slow axis of the film is tilted with respect to the longitudinal direction of the film. Here, oblique stretching of the non-oriented film may be carried out any typical method known to those skilled in the art.

The slow axis of the first retardation layer may be tilted at an angle of about +65° to +75° or about −65° to −75° with respect to a transmission axis of the polarizer. Within this range, an angle formed by the slow axis of the first retardation layer and the slow axis of the second retardation layer can satisfy a predetermined value, thereby allowing reduction in both front reflectivity and side reflectivity. Preferably, the slow axis of the first retardation layer is tilted at an angle of about +68° to about +73° or about −68° to about −73°, more preferably +69° to +72° or −69° to −72° with respect to the transmission axis of the polarizer.

Although not shown in FIG. 1, the first retardation layer 120 may be adhesively attached to the polarizer 110 via an adhesive layer. Here, the adhesive layer may be formed of, for example, at least one selected from the group of a photocurable adhesive and a pressure-sensitive adhesive (PSA), without being limited thereto.

The first retardation layer interacts with the second retardation layer to convert wavelength-dependent linear polarization into circular polarization to increase a degree of circular polarization, thereby reducing the front reflectivity and the side reflectivity. As described below, the second retardation layer may be prepared by coating a composition for the second retardation layer onto the first retardation layer to form a coating layer, followed by oblique stretching. In preparation of the obliquely stretched second retardation layer, an angle formed by the slow axis of the second retardation layer and the transmission axis of the polarizer is adjusted to about +6° to about +8° or about −6° to about −8°.

When the first retardation layer and the second retardation layer have different wavelength dispersions, increase in difference in wavelength dispersion between the first retardation layer and the second retardation layer can reduce a degree of wavelength-dependent circular polarization (degree of conversion of linear polarization into circular polarization through the two layers), causing deterioration in anti-reflection performance. When the second retardation layer is laminated on the first retardation layer without using any adhesive layer or bonding layer, the degree of wavelength-dependent circular polarization can be maximized by allowing the ratio of out-of-plane retardation of the second retardation layer at a wavelength about 550 nm to thickness of the second retardation layer to fall within the range set forth herein and adjusting the angle between the slow axis of the second retardation layer and the transmission axis of the polarizer to a range of about +6° to about +8° or about −6° to about −8°, whereby wavelength-dependent anti-reflection performance can be significantly improved while improving processability upon fabrication of the polarizing plate by a roll-to-roll process.

In one embodiment, a ratio of short wavelength dispersion of the second retardation layer to short wavelength dispersion of the first retardation layer (short wavelength dispersion of the second retardation layer/short wavelength dispersion of the first retardation layer) may range from about 1 to 1.08, specifically from about 1 to about 1.07, and a ratio of long wavelength dispersion of the second retardation layer to long wavelength dispersion of the first retardation layer (long wavelength dispersion of the second retardation layer/long wavelength dispersion of the first retardation layer) may range from about 0.96 to about 1, specifically about 0.97 to about 1. Within these ranges, wavelength-dependent reflectivity can be reduced.

The second retardation layer 130 may include an obliquely stretched coating layer prepared by coating the composition for the second retardation layer onto the lower surface of the first retardation layer, followed by stretching, as described below. Thus, the second retardation layer can allow reduction in thickness of the polarizing plate.

In one embodiment, the second retardation layer may have a thickness of about 2 μm to about 8 μm, specifically about 3 μm to about 7 μm, more specifically about 4 μm to about 6 μm. Within this range, the second retardation layer can have uniform out-of-plane retardation over the entire width thereof while allowing reduction in thickness of the polarizing plate.

As described above, the second retardation layer 130 has an Rth/d value of about −33 μm/nm to about −15 μm/nm, preferably about −30 μm/nm to about −15 μm/nm, more preferably about −30 μm/nm to about −17 μm/nm. Within this range, when the second retardation layer is directly formed on the first retardation layer without using any adhesive layer or bonding layer, the second retardation layer can increase the degree of side circular polarization, thereby improving side anti-reflection performance, in combination with the first retardation layer.

Thus, the second retardation layer 130 has positive dispersion, and may have a short wavelength dispersion of about 1 to about 1.1 and a long wavelength dispersion of about 0.96 to about 1. Within these ranges, a difference in wavelength dispersion between the second retardation layer and the first retardation layer can be reduced, thereby increasing the degree of wavelength-dependent circular polarization, and thus improving anti-reflection performance.

The slow axis of the second retardation layer 130 may be tilted at an angle of about +6° to about +8° or about −6° to about −8° with respect to the transmission axis of the polarizer. Within this range, even when the second retardation layer is an obliquely stretched retardation film, the angle between the slow axis of the second retardation layer and the slow axis of the first retardation layer can satisfy a predetermined value, thereby improving the degree of side circular polarization and thus reducing side reflectivity. Preferably, the slow axis of the second retardation layer 130 is tilted at an angle of +6.5° to +7.5° or −6.5° to −7.5° with respect to the transmission axis of the polarizer.

The second retardation layer 130 may have an out-of-plane retardation of about −200 nm to −100 nm, specifically about −150 nm to about −105 nm, at a wavelength of about 550 nm. Within this range, the second retardation layer can increase the degree of side circular polarization, thereby reducing side reflectivity In one embodiment, the slow axis of the first retardation layer may be disposed at an angle of about 58° to about 70°, specifically about 60° to about 70°, more specifically about 63° to about 67° with respect to the slow axis of the second retardation layer. Within this range, the degree of front circular polarization can be increased.

Figure 2:
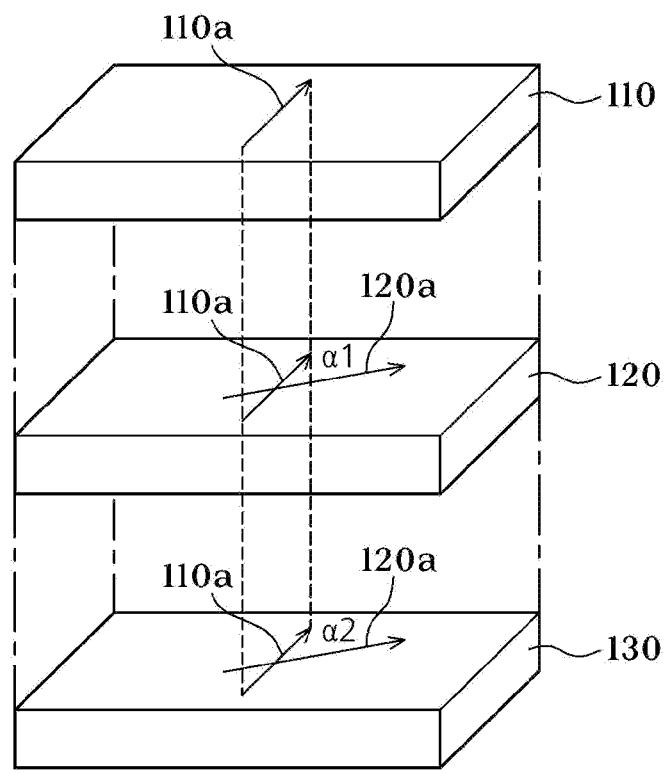
FIG. 2 is a view illustrating arrangement relations between a transmission axis of a polarizer, a slow axis of a first retardation layer, and a slow axis of a second retardation layer in the polarizing plate according to the embodiment.

FIG. 2 is a view illustrating relations between the transmission axis of the polarizer, the slow axis of the first retardation layer, and the slow axis of the second retardation layer in the polarizing plate according to the embodiment of the present invention. Referring to FIG. 2, the slow axis 120a of the first retardation layer may form an angle (α1) of about +65° to about +75° with respect to the transmission axis of the polarizer, and the slow axis 130a of the second retardation layer may form an angle (α2) of about +6° to about +8° with respect to the transmission axis of the polarizer.

The second retardation layer 130 may have an in-plane retardation of about 80 nm to about 130 nm (for example, 80 nm, 90 nm, 100 nm, 110 nm, 120 nm or 130 nm), specifically about 90 nm to 130 nm, at a wavelength of about 550 nm. Within this range, the second retardation layer can improve anti-reflection performance in combination with the first retardation layer.

The second retardation layer 130 may have a degree of biaxiality of about −2 to about 0, specifically about −1 to about 0, at a wavelength of about 550 nm. Within this range, the second retardation layer can improve the degree of side circular polarization, thereby reducing side reflectivity.

The second retardation layer 130 may have an index of refraction of about 1.4 to about 1.6, specifically about 1.45 to about 1.55. Within this range, an index of refraction ratio of the second retardation layer to the first retardation layer can be controlled to a desired level, thereby allowing increase in transparency.

The second retardation layer 130 may be prepared by coating the composition for the second retardation layer on the lower surface of the first retardation layer 120 to a predetermined thickness, followed by drying and/or curing to form a coating layer, and obliquely stretching the first retardation layer and the coating layer.

Next, the composition for the second retardation layer will be described.

The second retardation layer may be a non-liquid crystal layer. If the second retardation layer is a liquid crystal layer, the polarizing plate necessarily requires an alignment film to orient the liquid crystal at a certain angle, causing generation of foreign matter.

The composition for the second retardation layer is used to form a non-liquid crystal coating layer, and may include at least one selected from the group of cellulose ester polymers and styrene (or polystyrene) polymers, wherein the cellulose ester polymers and the styrene polymers may be each independently substituted with a halogen, a nitro group, and an alkyl group (for example, a $C_1$ to $C_{20}$ alkyl group), an alkenyl group (for example, a $C_2$ to $C_{20}$ alkenyl group), a cycloalkyl group (for example, a $C_3$ to $C_{10}$ cycloalkyl group), an aryl group (for example, a $C_6$ to $C_{20}$ aryl group), a heteroaryl group (for example, a $C_3$ to $C_{10}$ heteroaryl group), an alkoxy group (for example, a $C_1$ to $C_{20}$ alkoxy group), and a halogen-containing functional group. The cellulose ester polymers and the styrene polymers may be each independently a monomer, an oligomer, or a polymer. Herein, the terms "alkyl", "alkenyl", "cycloalkyl", "aryl", "heteroaryl", and "alkoxy" each refer to a halogen-free functional group, for convenience of description.

In the composition for the second retardation layer, the cellulose ester polymers may be used alone or as a mixture thereof, and the styrene polymers may be used alone or as a mixture thereof.

Herein, the term "halogen" refers to F, Cl, Br or I, preferably F.

In addition, the term "halogen-containing functional group" refers to an organic functional group containing at least one halogen, and may include an aromatic functional group, an aliphatic functional group, or an alicyclic functional group. For example, the halogen-containing functional group may refer to a halogen-substituted $C_1$ to $C_{20}$ alkyl group, a halogen-substituted $C_2$ to $C_{20}$ alkenyl group, a halogen-substituted $C_2$ to $C_{20}$ alkynyl group, a halogen-substituted $C_3$ to $C_{10}$ cycloalkyl group, a halogen-substituted $C_1$ to $C_{20}$ alkoxy group, a halogen-substituted $C_2$ to $C_{20}$ acyl group, a halogen-substituted $C_6$ to $C_{20}$ aryl group, or a halogen-substituted $C_7$ to $C_{20}$ arylalkyl group, without being limited thereto.

In one embodiment, the cellulose ester polymer may include at least one selected from the group of cellulose acetate, cellulose acetate propionate, and cellulose acetate butyrate, without being limited thereto.

The aforementioned cellulose ester and styrene polymers used in preparation of the second retardation layer may be prepared by any typical method known to those skilled in the art or may be any suitable commercially available product.

Preferably, the composition for the second retardation layer may include at least one selected from the group of a halogen-substituted cellulose ester polymer, a halogen-substituted styrene polymer, a halogen-containing functional group-substituted cellulose ester polymer, and a halogen-containing functional group-substituted styrene polymer. In this case, the polarizing plate can have improved light resistance.

In one embodiment, with regard to light resistance, a laminate of the first retardation layer and the second retardation layer may have a variance in out-of-plane retardation (ΔRth) of about 10 nm or less, specifically about 0 nm to 10 nm, as calculated according to Equation 1:

$$\Delta Rth = |Rth(0\ hr) - Rth(120\ hr)|, \quad (1)$$

where Rth(0 hr) denotes an absolute value (unit: nm) of initial Rth of the laminate of the first retardation layer and the second retardation layer, as measured at a wavelength of about 550 nm, and Rth(120 hr) denotes an absolute value (unit: nm) of Rth of the laminate of the first retardation layer and the second retardation layer, as measured at a wavelength of about 550 nm after irradiation of the laminate with light having a wavelength of about 360 nm at a fluence of 720 mJ/cm² for about 120 hours.

In Equation 1, the "laminate of the first retardation layer and the second retardation layer" may include not only a laminate in which the second retardation layer is directly formed on the first retardation layer, but also a laminate in which a primer layer and the second retardation layer are sequentially formed on the first retardation layer.

In addition to the cellulose ester and styrene polymers, the composition for the second retardation layer may further include at least one additive selected from the group of an anti-blocking agent, an antistatic agent, a colorant such as a pigment, and a dispersant, without being limited thereto.

In one embodiment, the composition for the second retardation layer may be free from an aromatic additive such as naphthyl benzoate.

The polarizer 110 serves to convert incident natural light or polarized light into light linearly polarized in a specific direction, and may be formed of a polymer film containing a polyvinyl alcohol resin as a main component. Specifically, the polarizer 110 may be prepared by dyeing the polymer film with iodine or a dichroic dye, followed by stretching in the machine direction (MD). Specifically, the polarizer may be prepared through swelling, dyeing, stretching, and cross-linking steps.

The polarizer 110 may have a total luminous transmittance of about 43% or more, for example, about 43% to about 50%, and a polarization degree of about 99% or more, for example, about 99% to about 100%. Within these ranges, the polarizer can improve anti-reflection performance in combination with the first retardation layer and the second retardation layer.

The polarizer 110 may have a thickness of about 2 μm to about 30 μm, specifically about 4 μm to about 25 μm. Within this range, the polarizer can be used in the polarizing plate.

The protective film 140 is formed on the upper surface of the polarizer 110 to protect the polarizer from an outside environment and to increase mechanical strength of the polarizing plate.

The protective film 140 serves to protect the polarizer from an outside environment, and may be an optically clear film, for example, a film formed of at least one resin selected from the group of a cellulose resin including triacetyl cellulose (TAC), a polyester resin including polyethylene terephthalate, polybutylene terephthalate, polyethylene naphthalate (PEN), and polybutylene naphthalate, a cyclic polyolefin resin, a polycarbonate resin, a polyether sulfone resin, a polysulfone resin, a polyamide resin, a polyimide resin, a polyolefin resin, a polyarylate resin, a polyvinyl alcohol resin, a polyvinyl chloride resin, and a polyvinylidene chloride resin. Specifically, the protective film may be a TAC film or a PET film.

The protective film 140 may have a thickness of about 5 μm to 70 μm, specifically about 15 μm to 45 μm. Within this range, the protective film can be used in the polarizing plate.

Although not shown in FIG. 1, a functional coating layer may be formed on the upper surface of the protective film 140 to provide additional functions to the polarizing plate. For example, the functional coating layer may include a hard coating layer, an anti-fingerprint layer, and an anti-reflection layer. These functional coating layers may be laminated alone or in combination thereof. The protective film 140 may be attached to the polarizer 110 via a bonding layer. The bonding layer may be formed of a water-based or UV curable bonding agent, without being limited thereto.

Next, a polarizing plate according to another embodiment of the present invention will be described.

In the polarizing plate according to this embodiment, a polarizer, a first retardation layer, and a second retardation layer may be sequentially laminated on a lower surface of a protective film as described above and a primer layer may be formed on a lower surface of the first retardation layer. The primer layer is directly formed on the first retardation layer and the second retardation layer. The primer layer directly formed on the lower surface of the first retardation layer allows the second retardation layer to have high adhesion to the first retardation layer and can prevent the first retardation layer from being blocked during a roll-to-roll process, thereby facilitating formation of a laminate of the first retardation layer and the second retardation layer. In particular, when the first retardation layer is a cyclic polyolefin film, which can be blocked, making it difficult to form the second retardation layer thereon by the roll-to-roll process, formation of the primer layer on the first retardation layer can improve processability upon formation of the second retardation layer.

Now, the primer layer will be described in detail.

The primer layer contains particles. Through adjustment of the size of the particles in the primer layer, adhesion of the second retardation layer to the first retardation layer can be improved and processability can be improved upon forming the laminate of the first retardation layer and the second retardation layer. In one embodiment, an average particle diameter (D50) of the particles in the primer layer is smaller than the thickness of the primer layer and may range, for example, from about 1 nm to 500 nm, specifically about 100 nm to 300 nm. Within this range, the primer layer can provide prevention of blocking of the first retardation layer and increase in adhesion of the second retardation layer to the first retardation layer. The particles may have a spherical or non-spherical shape, without limitation. Preferably, the particles have a spherical shape. The particles may include at least one selected from the group of silicon oxide (for example, silica) and titanium oxide (for example, $TiO_2$), without being limited thereto.

The particles may be present in an amount of about 10 wt % to about 50 wt %, specifically about 10 wt % to about 30 wt %, in the primer layer. Within this range, the primer layer can prevent the first retardation layer from being blocked upon winding the first retardation layer onto a roll while increasing adhesion between the first retardation layer and the second retardation layer.

The primer layer may be formed by coating a composition including the particles and a curable resin, followed by curing. The curable resin may include at least one selected from the group of a thermosetting resin and a photocurable resin, without being limited thereto. For example, the curable resin may include modified or non-modified olefin resins, such as acrylic, ethylene, and propylene resins, without being limited thereto.

The primer layer may have a thickness of about 100 nm to about 500 nm, specifically about 150 nm to about 300 nm, which is greater than the average particle diameter of the particles. Within this range, the primer layer can prevent blocking of the first retardation layer, can increase adhesion of the second retardation layer, and can allow reduction in thickness of the polarizing plate.

An optical display apparatus according to the present invention may include the polarizing plate according to the embodiments of the present invention, and examples thereof may include organic light emitting diode (OLED) displays and liquid crystal displays.

In one embodiment, the OLED display may include: an OLED panel including a flexible substrate; and the polarizing plate according to the present invention laminated on the OLED panel.

In another embodiment, the OLED display may include: an OLED panel including a non-flexible substrate; and the polarizing plate according to the present invention laminated on the OLED panel.

Next, the present invention will be described in more detail with reference to some examples. However, it should be noted that these examples are provided for illustration only and are not to be construed in any way as limiting the present invention.

Example 1

A polyvinyl alcohol film (PS #60, Kuraray Co., Ltd., Japan, pre-stretching thickness: 60 μm) was stretched to 6 times an original length thereof in an aqueous solution of iodine at 55° C., thereby preparing a polarizer having a transmittance of 45%.

A first retardation layer (positive dispersion, short wavelength dispersion: 1.005, long wavelength dispersion: 0.995, Re at 550 nm: 220 nm, Rth at 550 nm: 130 nm) was prepared by obliquely stretching a cyclic polyolefin film (ZD film, Zeon Corporation) at an angle of 70°.

A primer layer prepared by mixing silica particles having an average particle diameter of 300 nm with a mixture of a modified propylene resin and an acrylic resin (content of the silica particles in the primer layer: 10 wt %, thickness of the primer layer: 500 nm) was formed on a lower surface of the first retardation layer.

A composition for a second retardation layer (including a halogen-containing cellulose acetate polymer) was coated onto a lower surface of the primer layer to a predetermined thickness, followed by drying a solvent used, and then the resulting coating layer was obliquely stretched 1.2 times at an angle of +6.5° with respect to the MD of the first retardation layer at a temperature of 140° C., thereby preparing a laminate in which a second retardation layer having specifications shown in Table 1 was formed on the lower surface of the first retardation layer. In the laminate, the first retardation layer had an Re of 225 nm, a short wavelength dispersion of 1.005, and a long wavelength dispersion of 0.995.

Then, a polarizing plate was fabricated by sequentially attaching the prepared polarizer and a triacetylcellulose film as a protective film to the upper surface of the first retardation layer. Values of angles (Angles 1 and 2) between the aforementioned axes of the polarizing plate are shown in Table 1.

Examples 2 to 3

A polarizing plate was fabricated in the same manner as in Example 1 except that the retardation, thickness, and wavelength dispersion of the second retardation layer and Angles 1 and 2 were changed as listed in Table 1. However, the second retardation layer was formed of the same material as in Example 1.

Comparative Examples 1 to 2

A polarizing plate was fabricated in the same manner as in Example 1 except that the retardation, thickness, and wavelength dispersion of the second retardation layer and Angles 1 and 2 were changed as listed in Table 1. However, the second retardation layer was formed of the same material as in Example 1.

Comparative Example 3

A polarizing plate was fabricated in the same manner as in Example 1 except that the wavelength dispersion of the second retardation layer was changed by adding 2-naphthyl benzoate as an additive to the second retardation layer.

The retardation, Re, Rth, and NZ of each of the first and second retardation layers were measured using an Axoscan polarimeter (AxoMetric Co., Ltd.).

Each of the polarizing plates prepared in Examples and Comparative Examples was evaluated as to the following properties. Results are shown in Table 1.

(1) Degree of circular polarization: The degree of circular polarization was measured by forcing light through the polarizing plate from the front (0°) using an Axoscan polarimeter (AxoMetric Co., Ltd., U.S.). Then, the degree of circular polarization was measured by forcing light through the polarizing plate from the side (60°) while rotating the polarimeter a full 360 degrees. Measured values of the degree of side circular polarization are shown in Table 1.

(2) Reflectivity (unit: %): Reflectivity was measured using a goniometer (DMS 803, Instrument Systems Inc. (Konica Minolta group), Japan). After measurement with respect to a white plate provided to the goniometer, luminance and contrast were measured using an angular scanning function. Each of the polarizing plates prepared in Examples and Comparative Examples was attached to a panel (glass substrate) via a pressure-sensitive adhesive, followed by measurement of front reflectivity and side reflectivity of the polarizing plate. Here, theta was measured at intervals of 5°, and reflectivity was determined by obtaining spectral transmittance/reflectance (SCE) values for incident light from the front (0°) and the side (60°).

(3) Light resistance (unit: nm): A laminate of the first retardation layer and the second retardation layer (including the primer layer between the first retardation layer and the second retardation layer) was separated from each of the polarizing plates prepared in Examples and Comparative Examples and was then evaluated as to light resistance. Specifically, Rth of the laminate of the first retardation layer and the second retardation layer was measured at a wavelength of 550 nm using an Axoscan polarimeter (AxoMetric Co., Ltd.). Then, Rth of the laminate of the first retardation layer and the second retardation layer was measured at a wavelength of 550 nm in the same manner as above after irradiating the laminate from the side of the second retardation layer with UVA (wavelength: 360 nm) at a fluence of 720 mJ/cm² for 120 hours using an exposure machine (Q-SUN Xe-1 model, Q-LAB Corporation). A variance in out-of-plane retardation (ΔRth) was calculated according to Equation 1:

$$\Delta Rth = |Rth(0\ hr) - Rth(120\ hr)|, \quad (1)$$

where Rth(0 hr) denotes an absolute value (unit: nm) of initial Rth of the laminate of the first retardation layer and the second retardation layer, as measured at a wavelength of about 550 nm, and Rth(120 hr) denotes an absolute value (unit: nm) of Rth of the laminate of the first retardation layer and the second retardation layer, as measured at a wavelength of about 550 nm after irradiation of the laminate with light having a wavelength of about 360 nm at a fluence of 720 mJ/cm² for about 120 hours.

(4) Detachment: Detachment of the second retardation layer from the first retardation layer was evaluated. First, 10 vertical lines and 10 horizontal lines were drawn on the laminate of the first retardation layer and the second retardation layer separated from each of the polarizing plates fabricated in Examples and Comparative Examples to divide the laminate into a total of 100 pieces. An adhesive tape was attached to the second retardation layer, followed by observing whether the second retardation layer was detached from the laminate upon peeling the adhesive tape off of the second retardation layer. When no pieces of the second retardation layer were detached from the laminate, a corresponding specimen was rated as OK, and, when any of the pieces was detached from the laminate, a corresponding specimen was rated as NG.

TABLE 1

| | | Example | | | Comparative Example | | |
|---|---|---|---|---|---|---|---|
| | | 1 | 2 | 3 | 1 | 2 | 3 |
| Second retardation layer | Re (nm) | 117 | 118 | 129 | 122.3 | 122.3 | 112.3 |
| | Rth (nm) | −110 | −105 | −118 | −60 | −110 | −105 |
| | Thickness (μm) | 5.7 | 4 | 4 | 1 | 50 | 9 |
| | NZ | −0.44 | −0.39 | −0.4 | −0.4 | −0.43 | −0.44 |
| | Rth/d (nm/μm) | −19.3 | −26.3 | −29.5 | −60 | −2.2 | −11.7 |
| | Short wavelength dispersion | 1.05 | 1.05 | 1.05 | 1.05 | 1.05 | 1.12 |
| | Long wavelength dispersion | 0.97 | 0.97 | 0.97 | 0.97 | 0.97 | 0.95 |
| Angle 1 (°) | | +70.5 | +70.5 | +71.5 | +69.5 | +69.5 | +69.5 |
| Angle 2 (°) | | +6.5 | +7 | +7.5 | +6.5 | +6.5 | +6.5 |
| Degree of circular polarization (min value) (%) | Side | 65 | 61 | 62 | 59 | 60 | 53 |
| Reflectivity (%) | Front | 0.11 | 0.12 | 0.11 | 0.16 | 0.14 | 0.25 |
| | Side | 3.7 | 3.8 | 3.9 | 5.8 | 5.9 | 6.5 |
| Light resistance reliability | | 1 | 0.8 | 0.5 | 1 | 1.5 | 15 |
| Detachment | | OK | OK | OK | NG | NG | OK |

\* Angle 1: An angle formed by the slow axis of the first retardation layer and the transmission axis of the polarizer.
\* Angle 2: An angle formed by the slow axis of the second retardation layer and the transmission axis of the polarizer.

As shown in Table 1, the polarizing plates according to the present invention had a significantly low front reflectivity of less than 1% and a significantly low side reflectivity of less than 5%, specifically 4% or less, exhibited good light resistance, and did not undergo detachment of the second retardation layer from the first retardation layer.

Conversely, the polarizing plates of Comparative Examples 1 and 2, having an Rth/d value outside the range according to the present invention, and the polarizing plate of Comparative Example 3, in which values of wavelength dispersion and Rth/d of the second retardation layer were outside the ranges according to the present invention, had much higher front reflectivity and side reflectivity than the polarizing plates of Examples and underwent detachment of the second retardation layer from the first retardation layer. In addition, the polarizing plate of Comparative Example 3 exhibited poor light resistance.

It should be understood that various modifications, changes, alterations, and equivalent embodiments can be made by those skilled in the art without departing from the spirit and scope of the invention.

The invention claimed is:

1. A polarizing plate comprising:
a polarizer; a first retardation layer; and a second retardation layer, the first retardation layer and the second retardation layer being sequentially laminated on a lower surface of the polarizer,
wherein the first retardation layer has a short wavelength dispersion of 1 to 1.03, a long wavelength dispersion of 0.98 to 1, and an in-plane retardation of 220 nm to 270 nm at a wavelength of 550 nm,
the second retardation layer has a short wavelength dispersion of 1 to 1.1, a long wavelength dispersion of 0.96 to 1, and an in-plane retardation of 80 nm to 130 nm at a wavelength of 550 nm,
a ratio (Rth/d) of out-of-plane retardation (Rth, unit:nm) of the second retardation layer at a wavelength of 550 nm to thickness (d, unit:μm) of the second retardation layer is from −33 nm/μm to −15 nm/μm, and
the second retardation layer has a thickness of 2 μm to 8 μm and an out-of-plane retardation of −200 nm to −100 nm at a wavelength of 550 nm.

2. The polarizing plate according to claim 1, wherein the first retardation layer is an obliquely stretched film and the second retardation layer is an obliquely stretched coating layer.

3. The polarizing plate according to claim 1, wherein the second retardation layer is directly formed on the first retardation layer.

4. The polarizing plate according to claim 1, wherein a slow axis of the first retardation layer is disposed at an angle of +65° to +75° or −65° to −75° with respect to a transmission axis of the polarizer.

5. The polarizing plate according to claim 1, wherein an angle defined between a slow axis of the first retardation layer and a slow axis of the second retardation layer is from 58° to 70°.

6. The polarizing plate according to claim 1, wherein a ratio of short wavelength dispersion of the second retardation layer to short wavelength dispersion of the first retardation layer is from 1 to 1.08.

7. The polarizing plate according to claim 1, wherein a ratio of long wavelength dispersion of the second retardation layer to long wavelength dispersion of the first retardation layer is from 0.96 to 1.

8. The polarizing plate according to claim 1, wherein the first retardation layer has a degree of biaxiality of 1 to 1.4 at a wavelength of 550 nm and the second retardation layer has a degree of biaxiality of −2 to 0 at a wavelength of 550 nm.

9. The polarizing plate according to claim 1, wherein the second retardation layer is a non-liquid crystal layer.

10. The polarizing plate according to claim 9, wherein the second retardation layer is formed of a composition for the second retardation layer, the composition comprising at least one selected from the group of a cellulose ester polymer and a styrene polymer, wherein the cellulose ester polymer and the styrene polymer are each independently substituted with at least one selected from the group of a halogen, a nitro group, and an alkyl group, an alkenyl group, a cycloalkyl group, an aryl group, a heteroaryl group, an alkoxy group, and a halogen-containing functional group.

11. The polarizing plate according to claim 10, wherein a laminate of the first retardation layer and the second retardation layer has a variance in out-of-plane retardation (ΔRth) of 10 nm or less, as calculated according to Equation 1:

$$\Delta Rth = |Rth(0\ hr) - Rth(120\ hr)|, \qquad (1)$$

where Rth(0 hr) denotes an absolute value (unit: nm) of initial Rth of the laminate of the first retardation layer and the second retardation layer, as measured at a wavelength of 550 nm, and Rth(120 hr) denotes an absolute value (unit: nm) of Rth of the laminate of the first retardation layer and the second retardation layer, as measured at a wavelength of 550 nm after irradiation of the laminate with light having a wavelength of 360 nm at a fluence of 720 mJ/cm$^2$ for 120 hours.

12. The polarizing plate according to claim 1, wherein a slow axis of the second retardation layer is disposed at an angle of +6° to +8° or −6° to −8° with respect to a transmission axis of the polarizer.

13. The polarizing plate according to claim 1, further comprising:
a primer layer formed on a lower surface of the first retardation layer.

14. The polarizing plate according to claim 13, wherein the primer layer contains particles having an average particle diameter (D50) of 1 nm to 500 nm.

15. The polarizing plate according to claim 14, wherein the particles comprise at least one selected from the group of silicon oxide and titanium oxide.

16. The polarizing plate according to claim 1, further comprising:
a protective film laminated on an upper surface of the polarizer.

17. An optical display apparatus comprising the polarizing plate according to claim 1.

18. The polarizing plate according to claim 1, wherein the thickness of the second retardation layer is 4 μm to 6 μm.

19. The polarizing plate according to claim 1, wherein the out-of-plane retardation of the second retardation layer is −150 nm to −105 nm at a wavelength of 550 nm.

* * * * *